(12) United States Patent
Karaman et al.

(10) Patent No.: US 11,208,531 B2
(45) Date of Patent: Dec. 28, 2021

(54) PRODUCTION OF POLYANILINE GRAPHITIC CARBON NITRIDE NANOCOMPOSITES WITH HIGH ELECTRICAL CONDUCTIVITY

(71) Applicant: Yildiz Teknik Universitesi, Istanbul (TR)

(72) Inventors: Ferdane Karaman, Istanbul (TR); Volkan Ugraskan, Istanbul (TR)

(73) Assignee: YILDIZ TEKNIK UNIVERSITESI, Istanbul (TR)

( * ) Notice: Subject to any disclaimer, the term of this patent is extended or adjusted under 35 U.S.C. 154(b) by 0 days.

(21) Appl. No.: 15/734,248

(22) PCT Filed: Jun. 3, 2020

(86) PCT No.: PCT/TR2020/050483
§ 371 (c)(1),
(2) Date: Dec. 2, 2020

(87) PCT Pub. No.: WO2020/251493
PCT Pub. Date: Dec. 17, 2020

(65) Prior Publication Data
US 2021/0363301 A1    Nov. 25, 2021

(30) Foreign Application Priority Data
Jun. 11, 2019  (TR) ................... 201908623

(51) Int. Cl.
*B82Y 40/00* (2011.01)
*B82Y 30/00* (2011.01)
*H01M 4/62* (2006.01)
*C08G 73/02* (2006.01)
*C08J 3/215* (2006.01)
*C08J 3/205* (2006.01)
*C08K 3/28* (2006.01)

(52) U.S. Cl.
CPC ........ *C08G 73/0266* (2013.01); *C08J 3/2053* (2013.01); *C08J 3/215* (2013.01); *C08K 3/28* (2013.01); *H01M 4/622* (2013.01); *H01M 4/624* (2013.01); *B82Y 30/00* (2013.01); *B82Y 40/00* (2013.01); *C08K 2201/001* (2013.01); *C08K 2201/011* (2013.01)

(58) Field of Classification Search
CPC ............ B82Y 30/00; B82Y 40/00; C08K 3/28
See application file for complete search history.

(56) References Cited

U.S. PATENT DOCUMENTS

2016/0233487 A1*  8/2016  Jun .................. H01M 4/13

FOREIGN PATENT DOCUMENTS

| CN | 104241617 A | 12/2014 |
|----|-------------|---------|
| NZ | 511221 A | 8/2003 |
| WO | 2019008550 A1 | 1/2019 |

OTHER PUBLICATIONS

Shi-Xiang Zhou, et al., Synthesis of flower-like PANI/g-C3N4 nanocomposite as supercapacitor electrode, Vacuum, 2017, pp. 1-11.
Shixiang Zuo, et al., Polyaniline/g-C3N4 composites as novel media for anticorrosion coatings, J. Coat. Technol. Res, 2017, pp. 1307-1314, vol. 14 No. 6.
Ashish Bahuguna et al., Ammonia-Doped Polyaniline-Graphitic Carbon Nitride Nanocomposite as a Heterogeneous Green Catalyst for Synthesis of Indole-Substituted 4H-Chromenes, ACS Omega, 2018, pp. 12163-12178, vol. 3.
Jing Lyu, et al., Electromagnetic Interference Shielding based on a High Strength Polyaniline-aramid Nanocomposite, Composites Science and Technology, 2017, pp. 1-22.

* cited by examiner

*Primary Examiner* — Khanh T Nguyen
(74) *Attorney, Agent, or Firm* — Bayramoglu Law Offices LLC

(57) ABSTRACT

A method for producing nano-composites comprising graphitic carbon nitride reduced to nano size, having high electrical conductivity is provided. The method includes the steps of: producing graphitic carbon nitride (g-$C_3N_4$) having a chemical formula ($C_3N_4$)$_m$, applying an obtained g-$C_3N_4$ powder via an ultrasonic homogenization method on concentrations, obtaining a nano g-$C_3N_4$ suspension, wherein a size of the nano g-$C_3N_4$ suspension changes between 10-100 nm as a result of applying the ultrasonic homogenization method, obtaining polyaniline with a chemical formula ($C_6H_7N$)$_n$ in an emeraldine salt form, obtaining a nano-composite, mixing in aniline or aniline-HCl water at concentrations of 0.1-1 mol/L, adding a nano graphitic carbon (nano g-$C_3N_4$) into a mixture and mixing between 10-60 minutes, carrying out a polymerization process by adding an oxidant to the mixture and obtaining the nano composite having the high electrical conductivity.

7 Claims, No Drawings

PRODUCTION OF POLYANILINE GRAPHITIC CARBON NITRIDE NANOCOMPOSITES WITH HIGH ELECTRICAL CONDUCTIVITY

CROSS REFERENCE TO THE RELATED APPLICATIONS

This application is the national stage entry of International Application No. PCT/TR2020/050483, filed on Jun. 3, 2020, which is based upon and claims priority to Turkish Patent Application No. TR2019/08623, filed on Jun. 11, 2019, the entire contents of which are incorporated herein by reference.

TECHNICAL FIELD

The invention is related to a method for producing polyaniline/graphitic carbon nitride (g-$C_3N_4$) nano-composites with high electrical conductivity.

The invention is particularly related to a method for producing nano-composites comprising graphitic carbon nitride reduced to nano size, having high electrical conductivity.

BACKGROUND

Conductive polymers with low density, easy synthesizable and anti-corrosive structure, have been used in different fields by means of their electrical conductivity features. However as conductivity is not at the level of conductivity of metals, the usage of conductive polymers have been limited.

Polyaniline which is a conductive polymer, has stood out besides the features observed in other polymers, as it has three different oxidation steps, and it can be obtained at low costs easily. In literature, polyaniline/g-$C_3N_4$ composites have been synthesized and studies have been carried out on the catalyzer and anti-corrosive properties of these composites (Zuo et al. 2017; Bahuguna et al. 2018). Due to the conductivity of g-$C_3N_4$ polyaniline/g-$C_3N_4$ composites have been synthesized based on the opinion that it may increase the conductivity of polyaniline. Polyaniline that has been doped with different materials in order to increase its conductivity, has values that vary between $10^{-7}$ to 814 S/cm according to the value range oxidation steps in studies mentioned in the literature and according to the type and amount of the dopant.

In batteries and energy storage systems which are some of the application areas of polymers and composites that exhibit high conductivity, metals and graphite are already being used as electrodes. Metals are subject to corrosion and therefore their usage fields are limited. The conductivity graphite is not very high (2000 S/cm). Organic materials that are cheap, light, flexible, durable against corrosion, that are environmentally friendly and high conductive are needed in order to be used as electrodes in the construction of particularly flexible electronic devices.

One of the application areas of conductive polymers and composites that are highly conductive is electromagnetic shields. In electromagnetic shield applications the higher the electrical conductivity of materials that are used besides metals, the higher their effects. Materials that have electrical conductivity of 2-10 S/cm can even be used. The conductivity value of polyaniline composites that have been prepared to be used to this aim, have been reported to be maximum 300 S/cm (Lyu et al., 2017).

Metals that are already being used in this field, have disadvantages in that, they are corrosive, high density and rigid, and in that they reflect radiation and are expensive to manufacture.

Various developments have been made in the art in relation to conductive polymers.

In the Chinese patent document numbered CN104241617 which is a prior art document, a polymer composite material and preparation method thereof comprising, an expanded graphite, sulphur and polyaniline is disclosed.

In the New Zealand patent document numbered NZ511221 of the prior art, a production method of composites having high conductivity comprising polyaniline and graphite is disclosed.

However in studies of the prior art, nano sized graphitic carbon nitride is not used. Graphite carbon nitride [formula: g-$C_3N_4$] resembles graphene in structure, however as the triazine groups it has contain unmapped electrons and as they can perform H-bonding, it is different from graphene and graphite. Besides this, the surface area of the nano sized materials is larger in comparison to those of micron size. Graphitic carbon nitride reduced to nano size is dissolved much better inside the conductive polymer and the functional groups thereof, due to their increased surface area interact better with polymer. These interactions cause the electrical conductivity of the composite to be very high.

SUMMARY

The aim of the invention is to produce nano-composites having high electrical conductivity, comprising graphitic carbon nitride reduced to nano size and polyaniline.

Another aim of this invention is to carry out nano composite production that enables organic polymers to be used as electrodes in high conductivity batteries, accumulators and electrochemical cells.

Another aim of this invention is to perform the production of nano composites that enable to produce flexible, environmentally friendly lightweight composite materials.

DETAILED DESCRIPTION OF THE EMBODIMENTS

The invention is a nano-composite production method having high electrical conductivity comprising the steps of;

producing graphitic carbon nitride (g-$C_3N_4$) having the chemical formula $(C_3N_4)_m$ (Formula I), by means of a thermal polymerization method at temperatures between 450 and 600° C.,

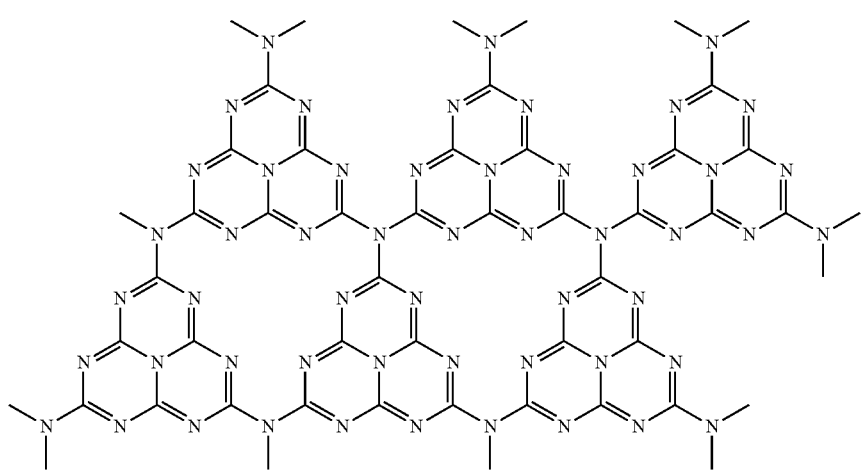

Formula-I

- applying the obtained g-C$_3$N$_4$ powder via an ultrasonic homogenization method on concentrations that vary between 1 and 20% in mass for 10-60 minutes at temperatures of 4-25° C.,
- obtaining nano g-C$_3$N$_4$ suspension whose size changes between 10-100 nm as a result of applying the ultrasonic homogenization method,
- obtaining polyaniline with the chemical formula (C$_6$H$_7$N)$_n$ (Formula II) in emeraldine salt form using oxidants at room temperature from 99% pure aniline or aniline hydrochloride monomers, having a monomer concentration value between 0.1 to 1 mol/L,

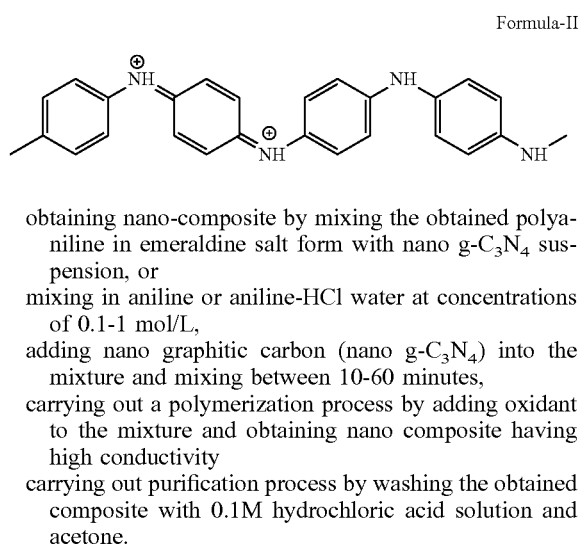

Formula-II

- obtaining nano-composite by mixing the obtained polyaniline in emeraldine salt form with nano g-C$_3$N$_4$ suspension, or
- mixing in aniline or aniline-HCl water at concentrations of 0.1-1 mol/L,
- adding nano graphitic carbon (nano g-C$_3$N$_4$) into the mixture and mixing between 10-60 minutes,
- carrying out a polymerization process by adding oxidant to the mixture and obtaining nano composite having high conductivity
- carrying out purification process by washing the obtained composite with 0.1M hydrochloric acid solution and acetone.

In the developed method, first of all g-C$_3$N$_4$ is produced from urea at temperatures between 450 and 600° C. by means of the thermal polymerization method (Lyu et al. 2011). Nano g-C$_3$N$_4$ suspension whose size changes between 10-100 nm is obtained following this process, by applying the ultrasonic homogenization method for 10-30 minutes at 4° C.'s to the 1% by mass of aqueous solution of the powder that has been produced.

Following this polyaniline in emeraldine salt form is synthesized by using various oxidants (iron (III) chloride, ammonium persulphate, potassium persulphate, sodium persulphate) at different mol ratios (monomer/oxidant ratio 1/1, 1/3, 1/5) at room temperature such that the monomer concentration obtained from 99% pure aniline or aniline hydrochloride monomers is 0.2 mol/L.

Finally, nano-composites are obtained by synthesizing the synthesized polyaniline in the presence nano g-C$_3$N$_4$ (in situ) or by synthesizing polyaniline and g-C$_3$N$_4$ separately and mixing them together (ex situ).

In the case of synthesizing polyaniline in the presence of nano g-C$_3$N$_4$ (in situ), first of all aniline or aniline-HCl is mixed in water at concentrations of 0.1-1 mol/L. Following this, nano graphitic carbon nitride is added to the solution such that the polyaniline/nano g-C$_3$N$_4$ o ratios are 2/1, 3/1, 5/1, 10/1 and this is mixed further for 10-60 minutes. Afterwards, iron (III) chloride, ammonium persulphate, potassium persulphate or sodium persulphate that is used as an oxidant is added to the solution such that the monomer/oxidant ratio is: 1/1, 1/3, 1/5 and the solution is mixed for 6-16 hours. As a result emeraldine form is obtained which is a conductive salt of polyaniline [formula: (C$_6$H$_7$N)$_n$. The composite that is obtained is washed with 0.1M hydrochloric acid solution and acetone and the purification process is carried out.

Nano-composites are prepared by polymerization or by applying different aniline/nano g-C$_3$N$_4$ ratios (polyaniline/nano g-C$_3$N$_4$ ratios (2/1, 3/1, 5/1, 10/1)). While nano-composites having a polyaniline/nano g-C$_3$N$_4$ ratio of 10/1 from the produced nano-composites exhibited the highest conductivity (3500 S/cm), it was noted that as the polyaniline ratio decreased conductivity was reduced. The lowest conductivity value was measured as 600 S/cm in nano-composites that had polyaniline/g-C$_3$N$_4$ ratio of 2/1. The conductivity of other nano-composites has been measured within this range.

The composite obtained after these process steps is formed of dark green coloured polyaniline that is a conductive polymer and graphitic carbon nitride in white powder form that is used as an additive. The physical state of the composite is in dark green powder form. It is moulded under pressure to establish a conductive tablet. Its conductivity feature is basically obtained from polyaniline and is supported with graphitic carbon nitride that exhibits semiconductive properties.

REFERENCES

1. Zuo, Shixiang, Yao Chen, Wenjie Liu, Chao Yao, Yingruo Li, Jiangquan Ma, Yong Kong, Huihui Mao, Zhongyu Li, and Yongsheng Fu. 2017. 'Polyaniline/gC 3 N 4 composites as novel media for anticorrosion coatings', Journal of Coatings Technology and Research, 14: 1307-14.
2. Bahuguna, Ashish, Priyanka Choudhary, Tripti Chhabra, and Venkata Krishnan. 2018. 'Ammonia-Doped Polyaniline-Graphitic Carbon Nitride Nanocomposite as a Heterogeneous Green Catalyst for Synthesis of Indole-Substituted 4H-Chromenes', ACS Omega, 3: 12163-78.
3. Lyu, Jing, et al. "Electromagnetic interference shielding based on a high strength polyaniline-aramid nanocomposite." Composites Science and Technology 149 (2017): 159-165. APA

What is claimed is:

1. A production method for a nano-composite with a high electrical conductivity, comprising the steps of:
producing graphitic carbon nitride (g-$C_3N_4$) comprising a chemical formula $(C_3N_4)_m$ (Formula-I), by a thermal polymerization method at a temperature between 450 and 600° C., Formula-I

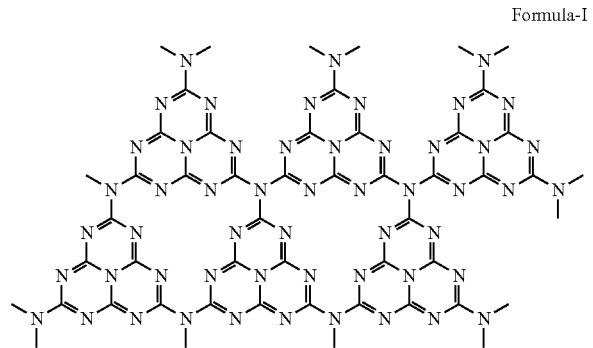

applying an obtained g-$C_3N_4$ powder via an ultrasonic homogenization method on concentrations, wherein the concentrations vary between 1 and 20% in mass for 10-60 minutes at a temperature of 4-25° C.,
obtaining a nano g-$C_3N_4$ suspension, wherein a size of the nano g-$C_3N_4$ suspension changes between 10-100 nm as a result of applying the ultrasonic homogenization method,
obtaining polyaniline with a chemical formula $(C_6H_7N)_n$ (Formula-II) in an emeraldine salt form using a first oxidant at room temperature from 99% pure aniline or aniline hydrochloride monomers, having a monomer concentration value between 0.1 to 1 mol/L, Formula-II obtaining a nano-composite by mixing the polyaniline in the emeraldine salt form with the nano g-$C_3N_4$ suspension, or
mixing in aniline or aniline-HCl water at concentrations of 0.1-1 mol/L to obtain a mixture,
adding a nano graphitic carbon nitride (nano g-$C_3N_4$) into the mixture and mixing between 10-60 minutes,
carrying out a polymerization process by adding a second oxidant to the mixture and obtaining the nano-composite with the high electrical conductivity.

2. The production method according to claim 1, wherein the first oxidant is one selected from iron (III) chloride, ammonium persulphate, potassium persulphate or sodium persulphate, and a monomer/oxidant ratio is: 1/1, 1/3, 1/5, in order to obtain the polyaniline in the emeraldine salt form.

3. The production method according to claim 2, comprising the step of carrying out a purification process by washing the nano-composite with a 0.1M hydrochloric acid solution and acetone.

4. The production method according to claim 2, comprising the step of adding the nano graphitic carbon nitride into the mixture comprising the aniline or aniline-HCl water to enable a polyaniline/nano g-$C_3N_4$ ratio is 2/1, 3/1, 5/1, 10/1.

5. The production method according to claim 1, comprising the step of carrying out a purification process by washing the nano-composite with a 0.1M hydrochloric acid solution and acetone.

6. The production method according to claim 5, comprising the step of adding the nano graphitic carbon nitride into the mixture comprising the aniline or aniline-HCl water to enable a polyaniline/nano g-$C_3N_4$ ratio is 2/1, 3/1, 5/1, 10/1.

7. The production method according to claim 1, comprising the step of adding the nano graphitic carbon nitride into the mixture comprising the aniline or aniline-HCl water to enable a polyaniline/nano g-$C_3N_4$ ratio is 2/1, 3/1, 5/1, 10/1.

* * * * *